US008355476B2

(12) United States Patent
Lee et al.

(10) Patent No.: US 8,355,476 B2
(45) Date of Patent: Jan. 15, 2013

(54) TIMESTAMPING METHOD AND APPARATUS FOR PRECISE NETWORK SYNCHRONIZATION

(75) Inventors: Seung Woo Lee, Seoul (KR); Dae Geun Park, Daejeon (KR); Bhum Cheol Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 946 days.

(21) Appl. No.: 12/423,090

(22) Filed: Apr. 14, 2009

(65) Prior Publication Data

US 2010/0074383 A1 Mar. 25, 2010

(30) Foreign Application Priority Data

Sep. 23, 2008 (KR) .................. 10-2008-0093388

(51) Int. Cl.
*H04L 7/00* (2006.01)
(52) U.S. Cl. ........................................ 375/354
(58) Field of Classification Search .................. 375/354
See application file for complete search history.

(56) References Cited

U.S. PATENT DOCUMENTS 6,148,051 A * 11/2000 Fujimori et al. ............. 375/356

2003/0021371 A1 * 1/2003 He ........................... 375/376
2007/0025481 A1 2/2007 Ryu
2007/0086487 A1 * 4/2007 Yasuda et al. ............. 370/503

FOREIGN PATENT DOCUMENTS

| KR | 10-2006-0064481 A | 6/2006 |
| KR | 1020070009390 A | 1/2007 |
| KR | 10-0720216 B1 | 5/2007 |
| KR | 1020080069106 A | 7/2008 |
| KR | 10-0741213 B1 | 7/2009 |

OTHER PUBLICATIONS

Korean Intellectual Property Office, Notice of Allowance, Appln. No. 10-2008-0093388, dated Oct. 27, 2010.
Hans Weibel and Dominic Bechaz, Implementation and Performance, 2004 Conference on IEEE 1588, Sep. 28, 2007.

* cited by examiner

*Primary Examiner* — Juan A Torres
(74) *Attorney, Agent, or Firm* — Kile Park Goekjian Reed & McManus PLLC (57) ABSTRACT

A timestamping apparatus for network synchronization includes a recovery unit and a timestamping unit. The recovery unit extracts a recovery clock operating at an operation frequency of a transmission terminal from a sync signal received from the transmission terminal. The timestamping unit measures a timestamp value of an arrival time of the sync signal by measuring a phase difference between the recovery clock and a local clock of a receiving terminal.

12 Claims, 6 Drawing Sheets

FIG. 1

Prior Art

TIMESTAMPING METHOD AND APPARATUS FOR PRECISE NETWORK SYNCHRONIZATION

CROSS-REFERENCE TO RELATED PATENT APPLICATION

This application claims the benefit of Korean Patent Application No. 10-2008-0093388, filed on Sep. 23, 2008, in the Korean Intellectual Property Office, the disclosure of which is incorporated herein in its entirety by reference.

BACKGROUND OF THE INVENTION

1. Field of the Invention

The present invention relates to time synchronization in a network, and more particularly, to a method of performing precise timestamping of transmission and receiving time values of a synchronization signal to improve precision of frequency synchronization and time (time of day, TOD) synchronization at a transmission/receiving terminal of a baseband communication network or in asynchronous modulation/demodulation when the transmission terminal and the receiving terminal are separated.

The present invention is supported by the Information Technology (IT) Research & Development (R&D) program of the Ministry of Knowledge and Economy (MKE) and the Institute for Information Technology Advancement (IITA) [2007-S-012-02, Development of Multimedia Convergence Network On-chip Technology].

2. Description of the Related Art

In general, in a packet switched network, a protocol for time synchronization is needed to synchronize time of systems distributed throughout the network. A system providing a reference time for the time synchronization is set as a master and a system subject to the time synchronization with the master is set as a slave. As the master and the slave exchange messages or sync signals including time information, the slave may be time synchronized with the master.

Of the protocols for the time synchronization between the master and the slave connected to the network, a network time protocol (NTP) is one of the previously used Internet protocols. The NTP is a time synchronization method that is currently widely used for the fields of local area network (LAN) and wide area network (WAN). The NTP synchronizes computers connected to the network using the coordinated universal time (UTC) that is an international standard time. Particularly, since additional hardware is not needed, the NTP is cost effective and is precise to a degree of tens to several tens of milliseconds in a normal Internet condition.

However, in the applied fields requiring a precise time synchronization, for example, in the field of multimedia streaming services in the packet switched network, due to a limit in the precision of the NTP, there is a demand for a time synchronization protocol having a higher precision level. To address this matter, IEEE has developed and standardized a precision time protocol (PTP) having an improved precision level.

Figure 1:
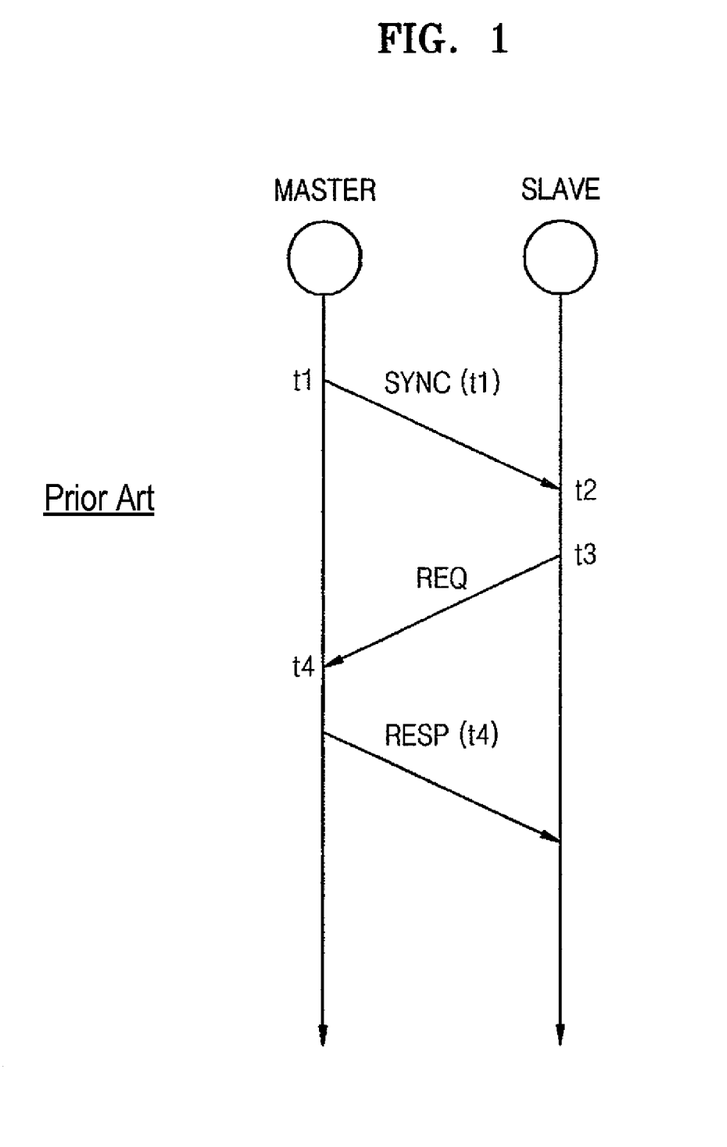
FIG. 1 illustrates one of the methods of performing time synchronization between the master and the slave in the PTP.

FIG. 1 illustrates one of the methods of performing time synchronization between the master and the slave in the PTP. The PTP performs time synchronization as the master and the slave exchange time information and a message or sync signal related to the time information in a manner similar to the NTP. Referring to FIG. 1, while exchanging the message or sync signal, the master and the slave determine an offset between the clock of the master and the clock of the slave and a propagation delay time of the message transmitted through a network so that the clock of the slave is synchronized to the clock of the master.

The master and the slave measure a start or arrival time of a signal by exchanging sync signals, for example, SYNC, REQ, and RESP, and then calculate the offset and the propagation delay time. As shown in FIG. 1, after the final time synchronization process, the slave has the time information of t1, t2, t3, and t4 and an offset O and a propagation delay time D are calculated using the time information and the following Equations 1-4.

$$D+O=t2-t1 \qquad \text{[Equation 1]}$$

$$D-O=t4-t3 \qquad \text{[Equation 2]}$$

$$D=\{(t2-t1)+(t4-t3)\}/2 \qquad \text{[Equation 3]}$$

$$D=\{(t2-t1)-(t4-t3)\}/2 \qquad \text{[Equation 4]}$$

As a condition to satisfy the above Equations, it is assumed that a propagation delay time $D_{MS}$ to transmit a signal from the master to the slave and a propagation delay time $D_{SM}$ to transmit a signal from the slave to the master are symmetrically the same. Unlike the NTP, the PTP uses an auxiliary hardware to measure a timestamp value corresponding to the transmission and receiving times of a sync signal and uses the measured timestamp value for the calculation of the offset and the propagation delay time so that precision of time synchronization may be lowered to a degree of microseconds or less.

In order to use the above conventional technology to an applied field that requires a high time synchronization precision, the following problem need to be solved first.

According to the conventional technology, while the master and the slave exchange a sync signal, a start time when the sync signal starts from a transmission terminal for transmitting the sync signal, or an arrival time when the sync signal arrives at the receiving terminal for receiving the sync signal, is measured. In doing so, timestamp values are measured using a local clock at each of the transmission terminal and the receiving terminal to be used as the timestamp values. Since the local clock frequencies of the transmission terminal and the receiving terminal are different from each other, an error is generated between an precise arrival time and an actually measured time value. As a result, the accuracies of a timestamp value of the start time of the sync signal measured at the transmission terminal and a timestamp value of the arrival time of the sync signal measured at the receiving terminal are deteriorated. If a measurement error is generated in the start time and arrival time of the sync signal, an error may be accordingly generated in the offset and the propagation delay time calculated at the slave. Therefore, the precision of the time synchronization may be deteriorated.

SUMMARY OF THE INVENTION

The present invention provides a time synchronization method of a master and a slave connected to a network, in which precise time of a sync signal is measured to improve precision of a network synchronization.

The present invention also provides a time synchronization method, in which a precise timestamp value of a start time of a sync signal is measured at a transmission terminal for transmitting the sync signal and a precise timestamp value of an arrival time of the sync signal is measured at a receiving terminal for receiving the sync signal so that time information is recorded and stored to improve precision of time synchronization.

The present invention also provides a time synchronization method, in which a timestamp value corresponding to a start time of a sync signal is measured using a local clock at a transmission terminal of the sync signal and a timestamp value corresponding to an arrival time of the sync signal is precisely measured by generating a clock multiplied from a local clock at a receiving terminal of the sync signal.

According to an aspect of the present invention, there is provided a timestamping apparatus for network synchronization, which comprises a recovery unit extracting a recovery clock operating at an operation frequency of a transmission terminal from a sync signal received from the transmission terminal, and a timestamping unit measuring a timestamp value of an arrival time of the sync signal by measuring a phase difference between the recovery clock and a local clock of a receiving terminal.

According to another aspect of the present invention, there is provided a timestamping method for network synchronization, which comprises extracting a recovery clock operating at an operation frequency of a transmission terminal from a sync signal received from the transmission terminal, and measuring a timestamp value of an arrival time of the sync signal by measuring a phase difference between the recovery clock and a local clock of a receiving terminal.

According to another aspect of the present invention, there is provided a timestamping method for network synchronization, which comprises transmitting a timestamp value of a start time of a sync signal measured using a local clock operating at an operation frequency of a transmission terminal, by including the timestamp value in the sync signal, extracting a recovery clock operating at an operation frequency of the transmission terminal from the sync signal received from the transmission terminal, and measuring a timestamp value of an arrival time of the sync signal by measuring a phase difference between the recovery clock and a local clock of a receiving terminal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. Like reference numerals denote like constituent elements throughout the attached drawings. In the following description, if detailed descriptions on related known functions or structures may be determined to make the concept of the present invention unclear, the detailed descriptions thereon will be omitted herein.

Also, when a part may "include" a certain constituent element, unless specified otherwise, it is not construed to exclude another constituent element but is construed to further include other constituent elements. The terms such as "~portion", "~er/or", "~module", and "~block" stated in the specification may signify a unit to process at least one function or operation and may be embodied by hardware, software, or a combination of hardware and software.

According to a timestamping method of the present invention, when a sync signal is transmitted from a transmission terminal, a time value corresponding to a transmission time $t_M$ is obtained by measuring a timestamping value TOD(M) of a transmission time using a local clock driving the sync signal and, when the sync signal is received at a receiving terminal, a time value corresponding to a receiving time $t_S$ is obtained by measuring a timestamp value TOD(S) using a local clock considering a phase difference between a recovery clock obtained from the sync signal and the local clock, so that synchronization between two communication nodes is embodied. In the present invention, a signal may indicate an information unit and/or data block transmitted from a device to another device and may include a term such as a packet, a frame, or a message.

Figure 2:
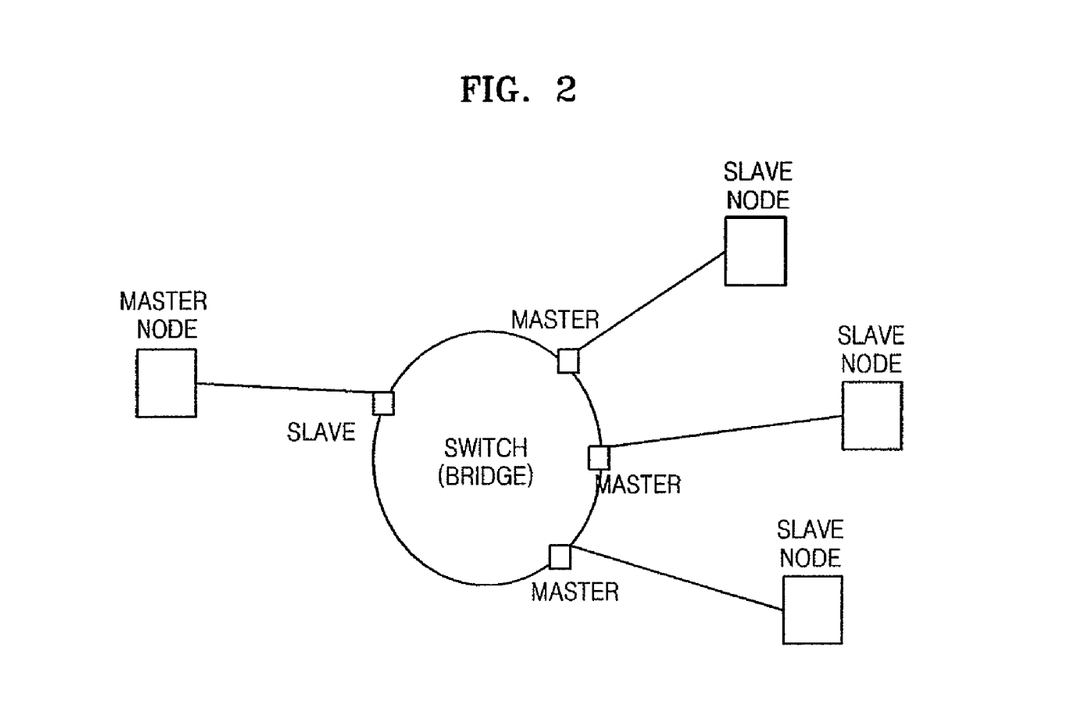
FIG. 2 illustrates the configuration of a network according to an embodiment of the present invention.

FIG. 2 illustrates the configuration of a network according to an embodiment of the present invention. Referring to FIG. 2, a master node is connected to a slave node via a bridge. Another relationship of the master and the slave is set via each connection port of a switch that is a bridge having a plurality of ports. Also, a relationship that the slave node uses the connection port of the bridge as the master node is set. Thus, the master and slave relationship through a network may be the minimum unit of a basic structure.

In the present embodiment, the master and the slave may be described as synchronization unit for transmitting or receiving a sync signal. Accordingly, each of the master and the slave may include a transmission unit and a receiving unit for transceiving a sync signal. A transmission terminal and a receiving terminal described below have the relationship of the master and the slave.

Figure 3:
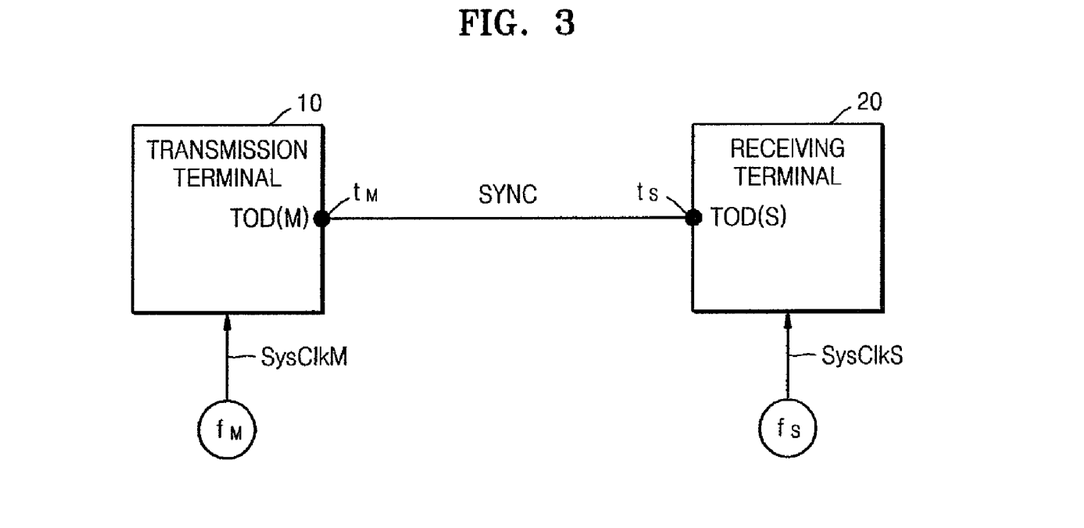
FIG. 3 illustrates the transmission and receiving of a sync signal between a transmission terminal that is a master or a slave and a receiving terminal that is a slave or a master.

FIG. 3 illustrates the transmission and receiving of a sync signal between a transmission terminal 10 that is a master or a slave and a receiving terminal 20 that is a slave or a master. In the following description, a case that the transmission terminal 10 transmits a sync signal SYNC and the receiving terminal 20 receives the sync signal SYNC is considered.

Referring to FIG. 3, when the transmission terminal 10 transmits the sync signal SYNC, a timestamp value corresponding to a time $t_M$ when the sync signal SYNC starts is included in the sync signal SYNC. In some cases, the timestamp value may be transmitted by being included in the next sync signal or other related signal. The timestamp value is presented using a local clock SysClkM operated at an operation frequency $f_M$ of the transmission terminal 10. Accordingly, the transmission terminal 10 and the receiving terminal 20 may present a signal with a time unit of the same type. Since a local clock is used as a transmission clock when the sync signal SYNC is transmitted from the transmission terminal 10, a start time $t_M$ of the sync signal SYNC is measured using the local clock. A timestamp value TOD(M) corresponding to the start $t_M$ time may be presented as a counter value operated by the local clock.

The sync signal SYNC including the timestamp value TOD (M) is transmitted to the receiving terminal 20. In some cases, the sync signal SYNC may be transmitted by being included in the next sync signal or other related signal.

The receiving terminal 20 receiving the sync signal SYNC measures a timestamp value corresponding to an arrival time $t_S$. In dosing so, a local clock SysClkS having an operation frequency $f_S$ of the receiving terminal 20 is used. However, the operation frequencies of the transmission terminal 10 and the receiving terminal 20 which are not synchronous do not match ($f_M \neq f_S$). Thus, when the arrival time of the sync signal SYNC is measured using the local clock of the receiving terminal 20, a time value corresponding to the arrival time needs to be extracted. In this case, the local clock of the receiving terminal 20 does not precisely match the arrival time and has a phase difference.

Figure 4:
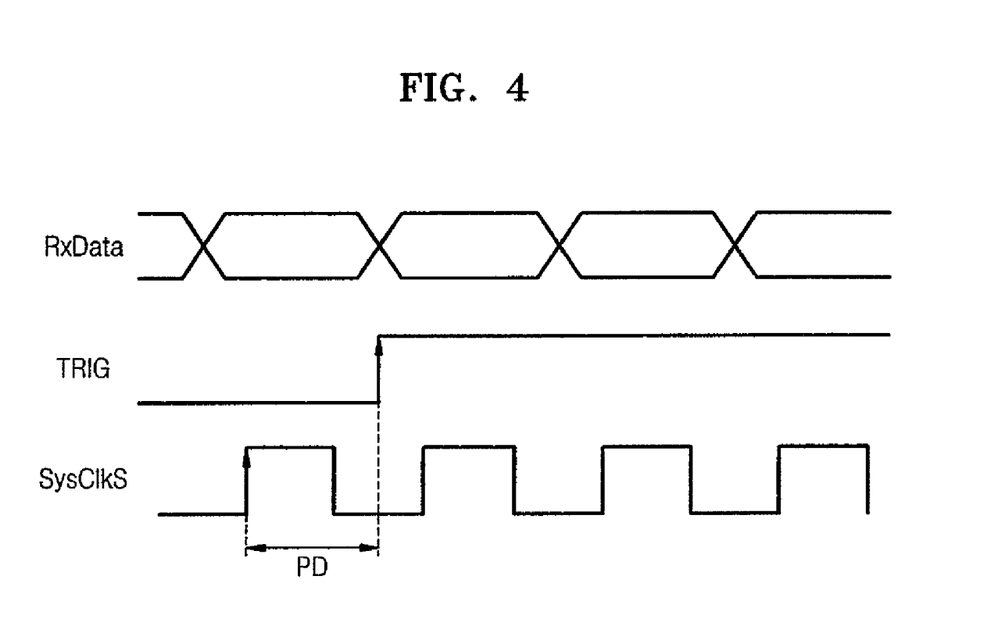
FIG. 4 illustrates a phase difference between a received sync signal and a local clock of a receiving terminal.

FIG. 4 illustrates a phase difference between the received sync signal and the local clock of the receiving terminal 20. Referring to FIG. 4, the sync signal SYNC starting from the transmission terminal 10 and arriving at the receiving terminal 20 may be presented as receiving data RxData. To find the arrival time of the sync signal SYNC, a signal, that is, a trigger signal TRIG, obtained through a data value of a particular format included in the sync signal SYNC or a combination of data is extracted. The transition time of the trigger signal TRIG is the arrival time of the sync signal SYNC. However, a phase difference PD is generated when the arrival time of the sync signal SYNC is measured based on a timestamp value using the local clock SysClkS of the receiving terminal 20 having a frequency different from that of the transmission terminal 10. Since the time information of the arrival time is obtained by converting a counter value operated by the local clock to the timestamp value TOD(S), the time value measured from the phase difference has a time error so that precision of synchronization is deteriorated.

Figure 5:
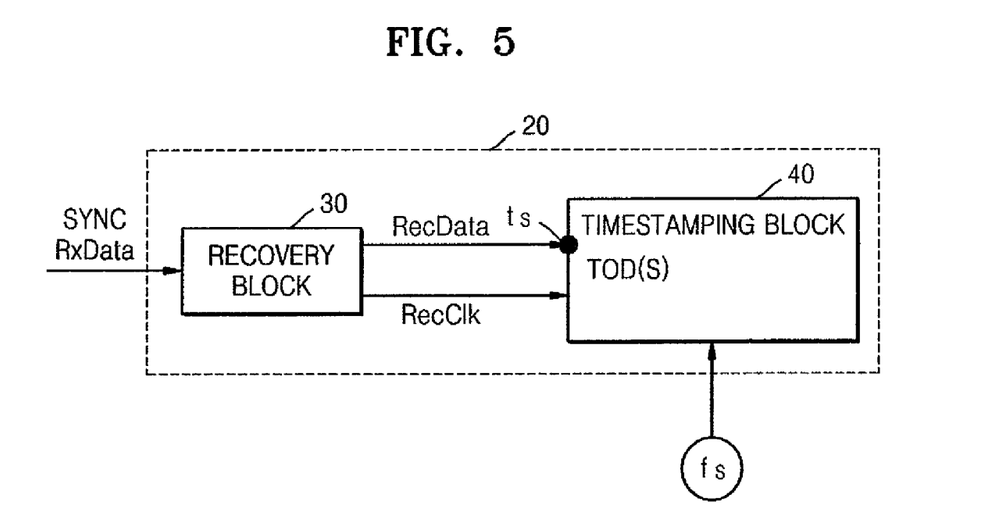
FIG. 5 is a block diagram for explaining a process of improving precision of a timestamp value by measuring an arrival time from a recovery clock of the received data at the receiving terminal.

FIG. 5 is a block diagram for explaining a process of improving precision of a timestamp value by measuring an arrival time from a recovery clock of the received data at the receiving terminal 20. Referring to FIG. 5, a recovery block 30 may extract a recovery clock RecClk of the same frequency component as the frequency component of the transmission terminal 10 from the received data RxData by means of a clock recovery function with respect to the received data RxData. A timestamping block 40 measures the arrival time $t_S$ of a recovery data RecData synchronized with the recovery clock RecClk, in the timestamp value TOD(S). While the trigger signal TRIG synchronized with the recovery clock RecClk is synchronized with the received data RxData arriving at a certain time, the trigger signal TRIG matches the frequency characteristic of the transmission terminal 10. Accordingly the trigger signal RTIG has a phase difference from the local clock SysClkS used to measure the arrival time at the receiving terminal 20. The local clock SysClkS is converted to a clock having a frequency component higher than the frequency $f_S$ of the receiving terminal 20 so that high precision timestamp value may be measured.

Figure 6:
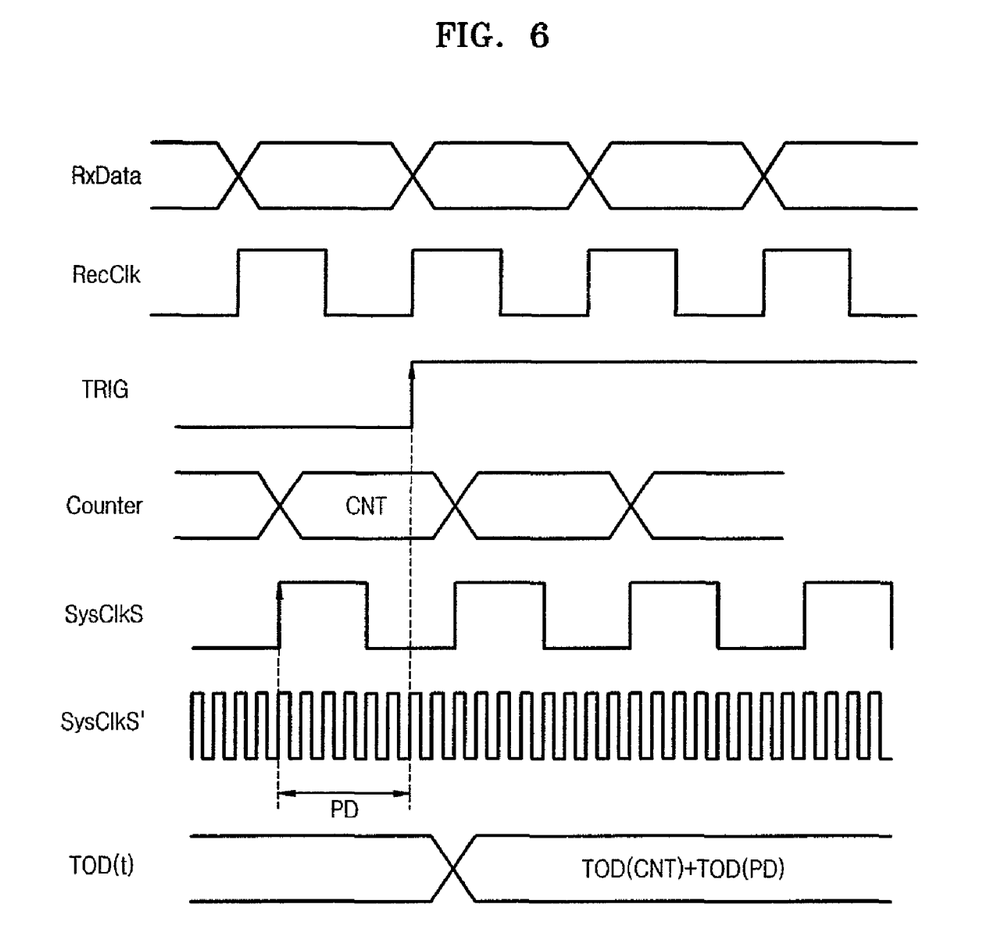
FIG. 6 is a timing diagram for converting a precise arrival time of a sync signal measured using a high frequency clock of the receiving terminal to a timestamp value(or a time value), according to an embodiment of the present invention.

FIG. 6 is a timing diagram for converting a precise arrival time of the sync signal SYNC measured using a high frequency clock of the receiving terminal 20 to a timestamp value (or a time value), according to an embodiment of the present invention. Referring to FIG. 6, the transmission terminal 10 transmits the sync signal SYNC to the receiving terminal 20. The transmission terminal 10 measures the timestamp value TOD(M) of a transmission time using the local clock of the transmission terminal 10 driving the sync signal SYNC corresponding to the transmission time $t_M$. The local clock of the transmission terminal 10 is operated at an operation frequency of the transmission terminal 10.

The receiving terminal 20 receives the sync signal SYNC in the format of the received data RxData and may extract the recovery clock RecClk from the received data RxData. The recovery clock RecClk has a frequency component of the transmission terminal 10 and is synchronized with the received data RxData. The transition time of the trigger signal TRIG matching the arrival time of the sync signal SYNC is in synchronism with the recovery clock RecClk. The transition time of the trigger signal TRIG has a phase difference PD from the transition time of the local clock SysClkS of the receiving terminal 20. The phase difference PD may generate an error in precision of a timestamp value TOD(CNT) generated from a counter operating at the local clock SysClkS of the receiving terminal 20.

To remove the time error, the arrival time is measured using a clock obtained by multiplying the frequency of the local clock of the receiving terminal 20. A multiplication clock SysClkS' has a frequency faster than the frequency of a clock of the receiving terminal 20 and the frequency of a clock of the transmission terminal 10. A timestamp value corresponding to the phase difference PD of the local clock SysClkS of the receiving terminal 20 and the trigger signal TRIG is measured using the multiplication clock SysClkS' and converted to a timestamp value TOD(PD) so that the timestamp value is generated from a counter value operating at the multiplication clock SysClkS'. Consequently, the timestamp value TOD(S) corresponding to the arrival time of the sync signal SYNC may be presented as a sum {TOD(CNT)+TOD(PD)} of the timestamp value TOD(CNT) measured by the local clock SysClkS and the timestamp value TOD(PD) measured by the multiplication clock SysClkS'.

The timestamp value {TOD(CNT)+TOD(PD)} obtained based on the multiplication clock SysClkS' and the local clock SysClkS of the receiving terminal 20, as the timestamp value TOD(S), is a time value that is not synchronized with the transmission terminal 10. That is, since the transmission terminal 10 and the receiving terminal 20 independently use local clocks, not the same clock, the clock of each of the transmission terminal 10 and the receiving terminal 20 is operated with a frequency offset. To remove the frequency offset, the timestamp value of the arrival time of the receiving terminal 20 needs to be converted to a timestamp value in a state of being frequency synchronized or phase synchronized with the transmission terminal 10.

In the present invention, to remove the frequency offset of the transmission terminal 10 and the receiving terminal 20, the following frequency conversion value is additionally calculated. First, a time value $T_S$ measured using the multiplication clock SysClkS' operation at a frequency higher than the operation frequency $f_S$ of the receiving terminal 20 is extracted and a frequency conversion value α calculated as a ratio of the start time of the sync signal SYNC at the transmission terminal 10 and the arrival time of the sync signal SYNC at the receiving terminal 20 is obtained. A transmission terminal is connected to a receiving terminal. When one or more other receiving terminal is additionally connected to the receiving terminal 20, the receiving terminal 20, as a transmission terminal, transmits the frequency conversion value α included in a sync packet or signal, with the timestamp value {TOD(CNT)+TOD(PD)}, to the next receiving terminal.

The frequency conversion value α is calculated from a timestamp value (TOD($t_{A1}$), TOD($t_{A2}$)) of the start time included in the sync packet that the transmission terminal 10 transmits to the receiving terminal 20 and a timestamp value (TOD($t_{B1}$), TOD($t_{B2}$)) of the receiving time of the receiving terminal 20, using an equation that α=[{TOD($t_{B1}$)−TOD($t_{B2}$)}/{TOD($t_{A1}$)−TOD($t_{A2}$)}].

Figure 7:
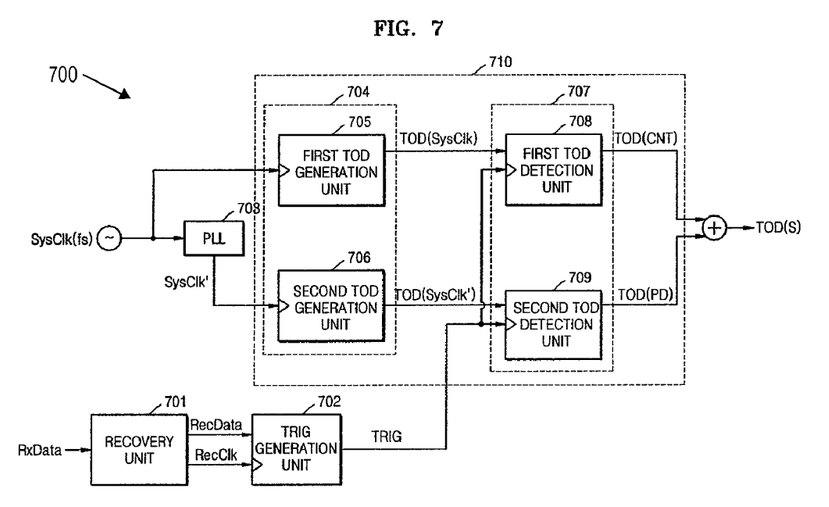
FIG. 7 is a block diagram of a timestamping apparatus receiving a sync signal transmitted from the transmission terminal and measuring a timestamp value of a receiving time according to an embodiment of the present invention.

FIG. 7 is a block diagram of a timestamping apparatus 700 receiving the sync signal SYNC transmitted from the transmission terminal 10 and measuring a timestamp value TOD (S) of a receiving time according to an embodiment of the present invention. Referring to FIG. 7, the timestamping apparatus 700 of the present embodiment includes a recovery unit 701, a TRIG generation unit 702, a phase sync circuit phase locked loop (PLL) 703, and a timestamping unit 710. The timestamping unit 710 includes a TOD generation unit 704 and a TOD detection unit 707.

The recovery unit 701 extracts the recovery clock RecClk from the received data RxData and outputs the recovery data RecData. The recovery clock RecClk has a frequency component of a transmission clock of the transmission terminal 10 and is input to the TRIG generation unit 702 with the recovery data RecData.

The TRIG generation unit 702 receives the recovery data RecData and the recovery clock RecClk and generates the trigger signal TRIG synchronized with the recovery clock. In the above embodiment, although the receiving time is detected using the trigger signal TRIG, the present invention is not limited thereto and the receiving time may be detected in a variety of known methods.

The phase sync circuit PLL 703 receives the local clock SysClkS of the receiving terminal 20 having a frequency of $f_S$ and generates the multiplication clock SysClkS' that is a multiplied clock. The TOD generation unit 704 generates a counter value by the local clock SysClkS and the multiplication clock SysClkS'. A first TOD generation unit 705 generates the counter value TOD(SysClkS) based on the local clock SysClkS and a second TOD generation unit 706 generates the counter value TOD(SysClkS') based on the multiplication clock SysClkS', and the first TOD generation unit 705 and the second TOD generation unit 706 input the counter value TOD(SysClkS) and the counter value TOD(SysClkS') to the TOD detection unit 707.

The TOD detection unit 707 receives the trigger signal TRIG from the TRIG generation unit 702 as a clock and data of the TOD(SysClkS) value and the TOD(SysClkS') value and extracts the TOD(SysClkS) value and the TOD(SysClkS') value as a timestamp value at the time of the transition of the trigger signal TRIG. A first TOD detection unit 708 outputs the timestamp value TOD(CNT) obtained at a clock of a slow frequency that is the local clock SysClkS of the receiving terminal 20. A second TOD detection unit 709 outputs the timestamp value TOD(PD) obtained at a clock of a fast frequency that is the multiplication clock SysClkS'.

Consequently, the timestamp value TOD(S) corresponding to the arrival time of the sync signal SYNC is presented as the sum {TOD(CNT)+TOD(PD)} of the timestamp value TOD (CNT) measured by the local clock SysClkS and the timestamp value TOD(PD) measured by the multiplication clock SysClkS'.

The frequency conversion value α is calculated from a timestamp value (TOD($t_{A1}$), TOD($t_{A2}$)) of the start time included in each of two sync signals SYNC and a timestamp value (TOD($t_{B1}$), TOD($t_{B2}$)) of the receiving time measured at the receiving terminal 20, using an equation that α=[{TOD($t_{B1}$)−TOD($t_{B2}$)}/{TOD($t_{A1}$)−TOD($t_{A2}$)}]. The frequency conversion value α is transmitted together with the TOD(S) and/or the timestamp value of the start time of the sync signals SYNC extracted at the receiving terminal 20 to the next receiving terminal connected in a cascaded format.

Figure 8:
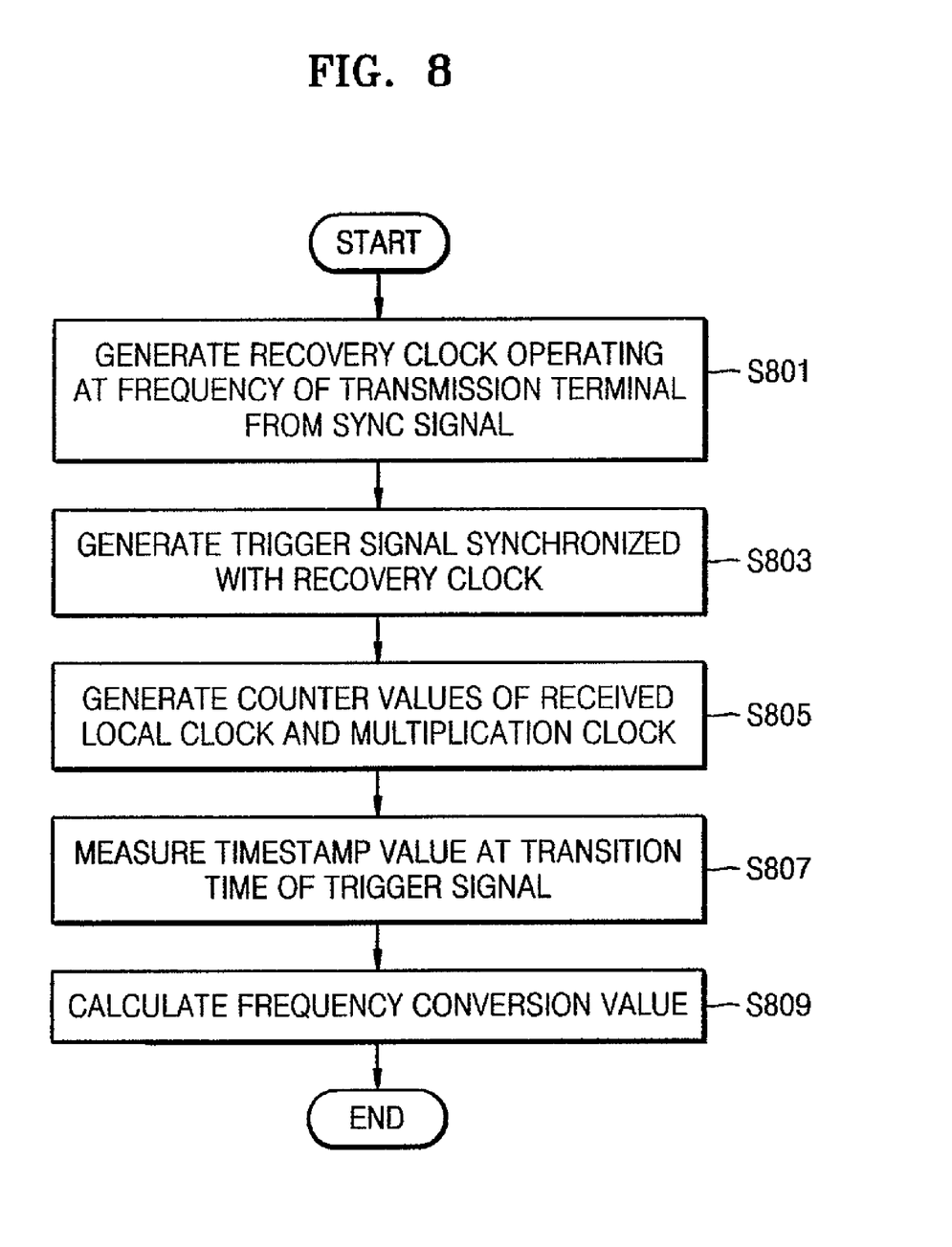
FIG. 8 is a flowchart for explaining a method of receiving a sync signal transmitted from the transmission terminal and measuring a timestamp value of a receiving time according to an embodiment of the present invention.

FIG. 8 is a flowchart for explaining a method of receiving a sync signal transmitted from the transmission terminal and measuring the timestamp value TOD(S) of a receiving time according to an embodiment of the present invention. Referring to FIG. 8, the transmission terminal 10 transmits a timestamp value of a start time of a sync signal measured using a local clock operating at an operation frequency of the transmission terminal 10, by including the timestamp value in the sync signal. A recovery clock operating at the same frequency as the operation frequency of the transmission terminal 10 is generated from the sync signal at the receiving terminal 20 (S801).In addition, the receiving terminal 20 generates a trigger signal synchronized with the recovery clock (S803).

A timestamp value of an arrival time of the sync signal is measured using a multiplication clock obtained by multiplying a local clock of the receiving terminal 20 to minimize a phase difference between the recovery clock and the local clock of the receiving terminal 20. A counter value of the local clock of the receiving terminal 20 and a counter value of the multiplication clock are generated (S805). Also, the multiplication clock is faster than the operation frequency of the receiving terminal 20 and operated at a frequency higher than the operation frequency of the transmission terminal 10. A timestamp value is measured at the transition time of the trigger signal using the counter values of the local clock and the multiplication clock (S807).

A frequency conversion value is calculated according to a ratio of the timestamp value of the start time extracted from the sync signal and the timestamp value of the arrival time of the measured sync signal (S809). The timestamp value of the start time of the sync signal is a value measured using the local clock operating at the operation frequency of the transmission terminal 10 by the transmission terminal 10. The calculated frequency conversion value and the timestamp value TOD(S) of the start time or arrival time of the sync signal are transmitted to the next receiving terminal.

According to the present invention, precision of frequency synchronization and time synchronization may be improved during asynchronous modulation/demodulation where the transmission terminal and the receiving terminal are separated, or at the transmission/receiving terminal of a baseband communication network.

As described above, in the network synchronization method according to the present invention, in the time synchronization between the master synchronization unit and the slave synchronization unit connected in a network, to improve precision of a timestamp value, a recovery clock is extracted from the received data arriving at the receiving terminal and a transition time indicating an arrival time synchronized with the recovery clock is measured using a clock multiplied to be faster than the local clock of the receiving terminal so that high precise time synchronization may be obtained.

In alternative embodiments, hard-wired circuitry may be used in place of or in combination with processor/controller programmed with computer software instructions to implement the invention. Thus, embodiments of the invention are not limited to any specific combination of hardware circuitry and software.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains. Also, as computer software commands to embody the present invention, hardware, software, or a combination of hardware and software may be used instead of a programmed processor/controller. Accordingly, the present invention is not limited by a specific combination of hardware and software.

The terms used in the present specification are used to merely describe the present invention, but not used to limit the scope of the present invention defined by the appended claims.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A timestamping apparatus for network synchronization, the apparatus comprising:
    a recovery unit extracting a recovery clock operating at an operation frequency of a transmission terminal from a sync signal received from the transmission terminal; and
    a timestamping unit measuring a timestamp value of an arrival time of the sync signal by measuring a phase difference between the recovery clock and a local clock of a receiving terminal,
    wherein the timestamping unit comprises:
        a time value generation unit generating a counter value using a local clock of the receiving terminal and a multiplication clock operating at a frequency higher than an operation frequency of a local clock generated to measure the phase difference; and
        a time value detection unit measuring the timestamp value at the arrival time of the sync signal using a sum of timestamp values generated based on the counter values of the local clock and the multiplication clock.

2. The timestamping apparatus of claim 1, wherein the multiplication clock has a frequency higher than the operation frequency of the transmission terminal.

3. The timestamping apparatus of claim 1, further comprising
    a trigger generation unit generating a trigger signal synchronized with the recovery clock and using the arrival time of the sync signal as a transition time,
    wherein the timestamping unit measures a timestamp value at the transition time of the trigger signal.

4. The timestamping apparatus of claim 1, wherein a frequency conversion value calculated at a ratio of a timestamp value of a start time and a timestamp value of an arrival time of the sync signal, and the timestamp value of the start time or the arrival time of the sync signal are transmitted to a next receiving terminal.

5. The timestamping apparatus of claim 4, wherein the timestamp value of the start time of the sync signal is measured using a local clock operating at an operation frequency of the transmission terminal by the transmission terminal.

6. A timestamping method for network synchronization, the timestamping method comprising:
    extracting a recovery clock operating at an operation frequency of a transmission terminal from a sync signal received from the transmission terminal; and
    measuring a timestamp value of an arrival time of the sync signal by measuring a phase difference between the recovery clock and a local clock of a receiving terminal,
    wherein the measuring the timestamp value comprises:
        generating a counter value using a local clock of the receiving terminal and a multiplication clock operating at a frequency higher than an operation frequency of a local clock generated to measure the phase difference; and
        measuring a timestamp value at an arrival time of the sync signal using a sum of timestamp values generated based on the counter values of the local clock and the multiplication clock.

7. The timestamping method of claim 6, wherein the multiplication clock has a frequency higher than an operation frequency of the transmission terminal.

8. The timestamping method of claim 6, wherein the measuring of a timestamp value comprises generating a trigger signal synchronized with the recovery clock and using the arrival time of the sync signal as a transition time and measuring a timestamp value at the transition time of the trigger signal.

9. The timestamping method of claim 6, further comprising:
    calculating a frequency conversion value at a ratio of a timestamp value of a start time and a timestamp value of the arrival time of the sync signal; and
    transmitting the frequency conversion value, and the timestamp value of the start time or the arrival time of the sync signal to a next receiving terminal.

10. The timestamping method of claim 9, wherein the timestamp value of the start time of the sync signal is measured using a local clock operating at an operation frequency of the transmission terminal by the transmission terminal.

11. A timestamping method for network synchronization, the timestamping method comprising:
    transmitting a timestamp value of a start time of a sync signal measured using a local clock operating at an operation frequency of a transmission terminal, by including the timestamp value in the sync signal;
    extracting a recovery clock operating at an operation frequency of the transmission terminal from the sync signal received from the transmission terminal;
    measuring a timestamp value of an arrival time of the sync signal by measuring a phase difference between the recovery clock and a local clock of a receiving terminal;
    calculating a frequency conversion value at a ratio of a timestamp value of a start time and a timestamp value of the arrival time of the sync signal; and
    transmitting the frequency conversion value, and the timestamp value of the start time or the arrival time of the sync signal to a next receiving terminal.

12. The timestamping method of claim 11, wherein the local clock of the receiving terminal is multiplied to measure the phase difference and a multiplication clock having a frequency higher than the operation frequency of the transmission terminal is used.

* * * * *